United States Patent
Dana

(10) Patent No.: US 6,218,948 B1
(45) Date of Patent: Apr. 17, 2001

(54) BILGE SENTRY

(76) Inventor: Alfred Dana, 2482 Neptune Ct., Cocoa, FL (US) 32926

( * ) Notice: Subject to any disclaimer, the term of this patent is extended or adjusted under 35 U.S.C. 154(b) by 0 days.

(21) Appl. No.: 09/374,300

(22) Filed: Aug. 16, 1999

Related U.S. Application Data

(60) Provisional application No. 60/096,705, filed on Aug. 17, 1998.

(51) Int. Cl.$^7$ .................................................. G08B 21/00
(52) U.S. Cl. ........................ 340/604; 340/612; 340/613; 340/616; 340/618; 340/620
(58) Field of Search .................................... 340/604, 606, 340/614, 616, 618, 620, 626, 613, 612

(56) References Cited

U.S. PATENT DOCUMENTS

| | | | |
|---|---|---|---|
| 4,349,882 | * | 9/1982 | Asmundsson et al. ............... 364/509 |
| 4,601,201 | * | 7/1986 | Oota et al. .............................. 73/304 |
| 4,733,560 | * | 3/1988 | Dam ........................................ 73/304 |
| 5,005,407 | * | 4/1991 | Koon ....................................... 73/290 |
| 5,049,878 | * | 9/1991 | Stern ...................................... 340/870 |
| 5,121,631 | * | 6/1992 | Koon ....................................... 73/290 |
| 5,546,005 | * | 8/1996 | Rauchwerger ........................ 340/620 |
| 5,929,754 | * | 7/1999 | Park et al. ............................. 340/439 |
| 5,973,415 | * | 10/1999 | Brenner et al. ....................... 307/118 |

* cited by examiner

Primary Examiner—Jeffery Hofsass
Assistant Examiner—Son M. Tang
(74) Attorney, Agent, or Firm—Frank A. Lukasik

(57) ABSTRACT

The invention is an oil-water detection device for monitoring the presence of water in a container. The device consists of a probe having two thin strips of sheeting within a fiberglass circuit board for sensing the presence of water in a container and generating a signal dependent on the presence of water, a divide counter and Stamp II micro-processor and an accessory communications link connected to the micro-processor. A power supply is also provided. The detection device can differentiate between oil and water and will not be activated merely by the presence of oil on the water.

7 Claims, 5 Drawing Sheets

BILGE SENTRY

This is a Continuation of Provisional application Ser. No. 60/096,705, filed Aug. 17, 1998.

BACKGROUND OF THE INVENTION

Field of the Invention

The invention relates generally to the detection of water by electronic means, and more particularly to an electronic probe for detection of occult water or oil in bilges or storage tanks.

In the marine and petroleum industries, the detection of water is often necessary to preserve equipment, fuel, and even human lives.

As an example, in the marine industry, unwanted water in bilges of ships and other vessels can amount to a lethal hazard if left undetected. History is full of well known instances where rising water in the bilge of a vessel, when undiscovered, has had fatal results and many lives have been lost. In the petroleum and aircraft industries, occult water inside of storage tanks has also had fatal consequences for aircraft and other vehicles where clean fuel is imperative.

Prior art devices used in the same context are prone to failure due to a constant off/on cycling as water levels fluctuate with the motion of the vessel, causing the activation float/switch to move with each water movement. This failure is common and potentially lethal. The prior art devices are also prone to running dry once they have pumped all of the available water from the bilge. They also, while pumping all of the water, pump all of the oil and other contaminants into the surrounding water.

As one example, a tank field as is usually found at airports, oil refineries, military installations, etc. can cover a vast area with storage tanks in vast numbers. Due to the nature of fuel tanks, in particular, jet fuel tanks where the tank has a floating "lid" designed to prevent the formation of dangerous fumes, rain water tends to leak past the edge seals of the "lids" and into the fuel. In the event that such water finds its way into the fuel tanks of an aircraft, the results are predictably bad. Current technology uses a variety of physical "sounding" methods which employ long wooden rods with a water sensitive coating affixed to one end which is then lowered into the fuel tank where the presence of water can be seen by color change in the coating. This method of detection is physically demanding and inefficient in terms of time and potential for human error. Furthermore, by nature, the fuel tanks often do not have bottoms which are perfectly level, giving rise to the possibility that water could be present but remain undetected by reason of the "sounding" being taken in the wrong place.

Use of the instant invention makes possible completely accurate monitoring of even vast tank fields in real time through the use of existing computer networking and satellite uplinks and other existing communications systems.

SUMMARY OF THE INVENTION

The invention provides a unique means whereby occult water can be detected remotely through the use of a detection probe connected via wires to the detection/signaling electronic circuitry.

The invention, in its current form, has at least two configurations both of which rely upon the same electronic circuitry for the detection of water and in one configuration, the circuitry can be connected to a signaling/activation means for controlling a bilge or other pumping device. In the second configuration, the electronic circuitry connects to an electronic measuring means whereby quantitative measurements of occult water can be made and the measurements can be output in a variety of ways such as digital/analog gauges or dials, through remote connection to computers and networks of same or other display or signaling means.

The primary element of the instant invention in whichever configuration it may be used, is a special TEFLON coated probe which is the primary detection means. The probe is composed of two thin strips of conductive material held in close proximity to each other. Each of the strips connects via a wire conductive means to an electronic assembly. The function of the electronic assembly is to collect and amplify the minute signal from the probe. The signal is caused to occur whenever the probe is brought into contact with water. The probe senses a change in capacitance which causes the emanation of the signal. Included within the electronic assembly are amplification and calibration circuits which provide a useful operating range and an interface between the device and the operator or monitoring means.

As an example, a pre-set calibration allows the probe device to manifest useful features such as alerting to the presence of water and, should the need arise, the automatic activation of a pumping means to remove the water and thereafter automatically deactivating the pumping means once the water returns to a safe level.

In actual use, the instant invention constantly monitors the water level present. It ignores the oil which floats upon the water surface and only activates the pumping/signaling means when the water rises to the pre-set level. Once the water level has been reduced to the pre-set level, the device deactivates the pumping means before the floating oil can reach the inlet of the pumping means.

DETAILED DESCRIPTION OF THE PREFERRED EMBODIMENTS

Figure 1:
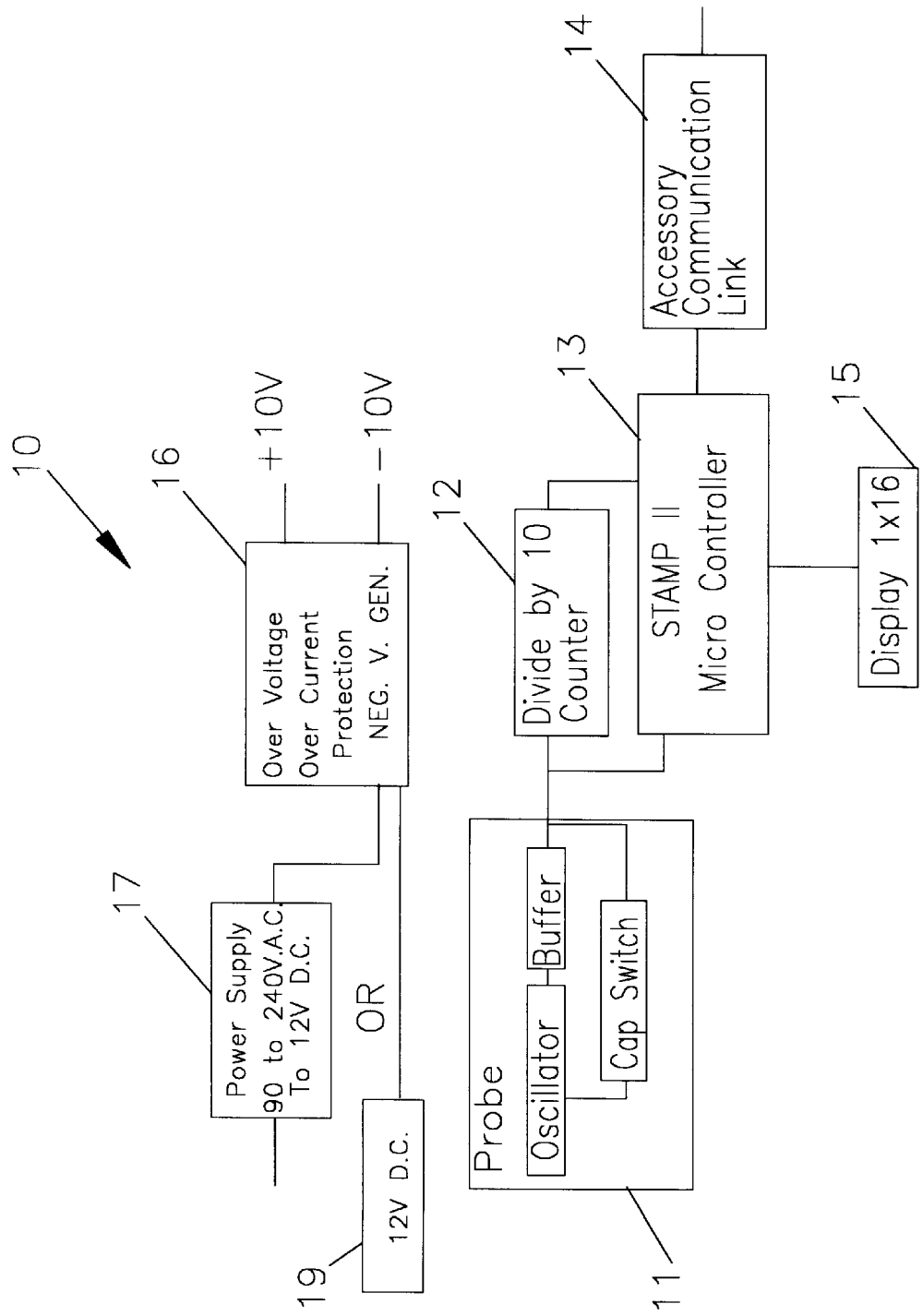
FIG. 1. is a flow diagram showing the discrete components of the instant invention configured as an "oil-water" detector.

Referring now to the drawings, wherein like numerals designate like and corresponding parts throughout the several views, in FIG. 1 the instant invention, configured as an "oil-water" detector is shown in a flow chart form and is designated overall by the numeral 10. Probe 11 connects to divide counter 12 and Stamp II micro-controller 13 and display 15. Outlet connections exit through communication link 14. Power is supplied through power supply 17 either as a 90 to 240 volt A.C. source or 12 v DC source 19. The power supply 17, from whatever source, is regulated and converted as necessary to either +10 mv or −10 v.

Figure 2:
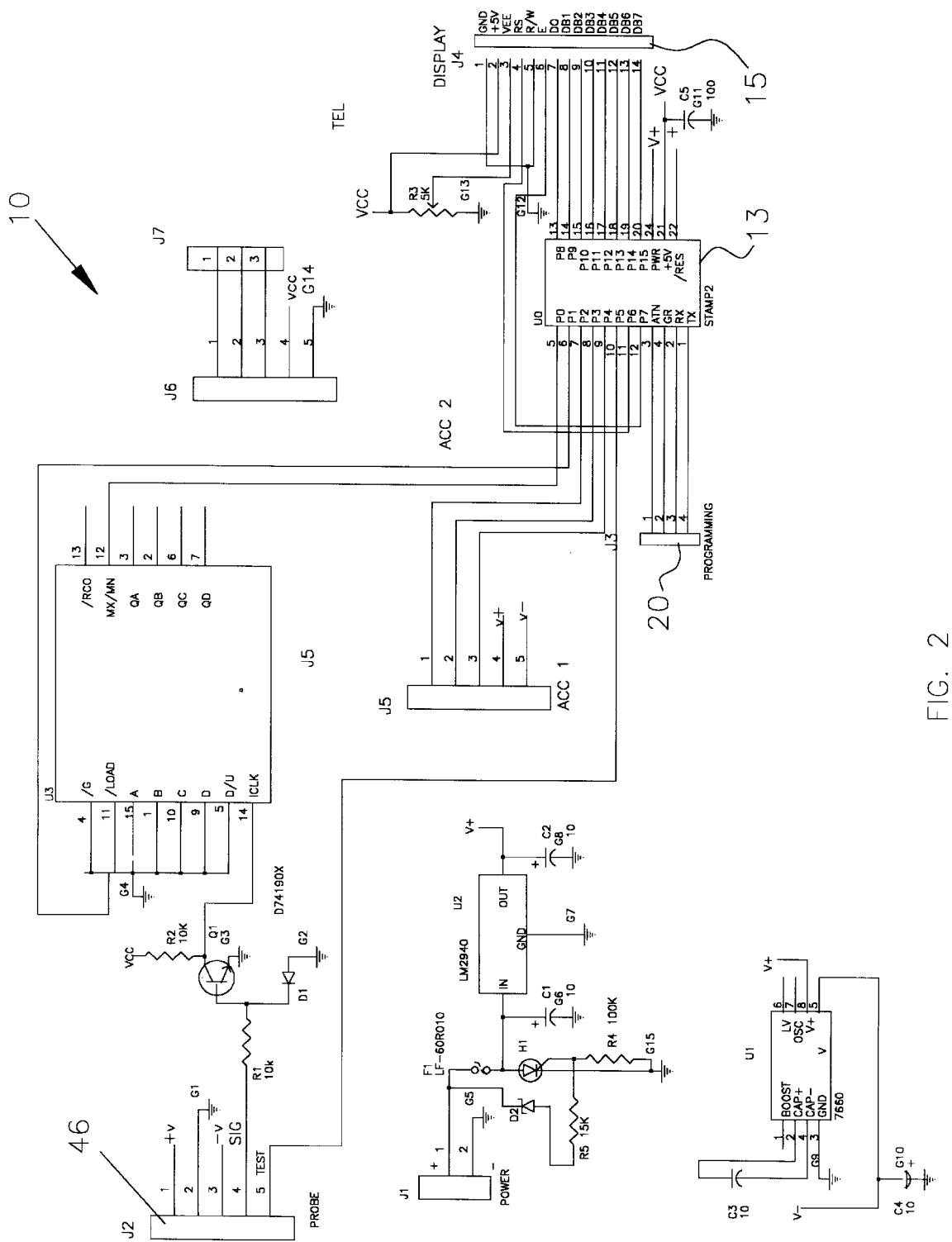
FIG. 2. is a circuit diagram of the main processing of the "oil-water" detector in accordance with the invention.

In FIG. 2, the actual circuitry of the oil-water detector 10 is shown in detail. Programming input 20 connects to Stamp II micro-controller 13 and to display 15. It is enumerated overall by the number 10 to show a corresponding relationship to the flow chart in FIG. 1.

Figure 3:
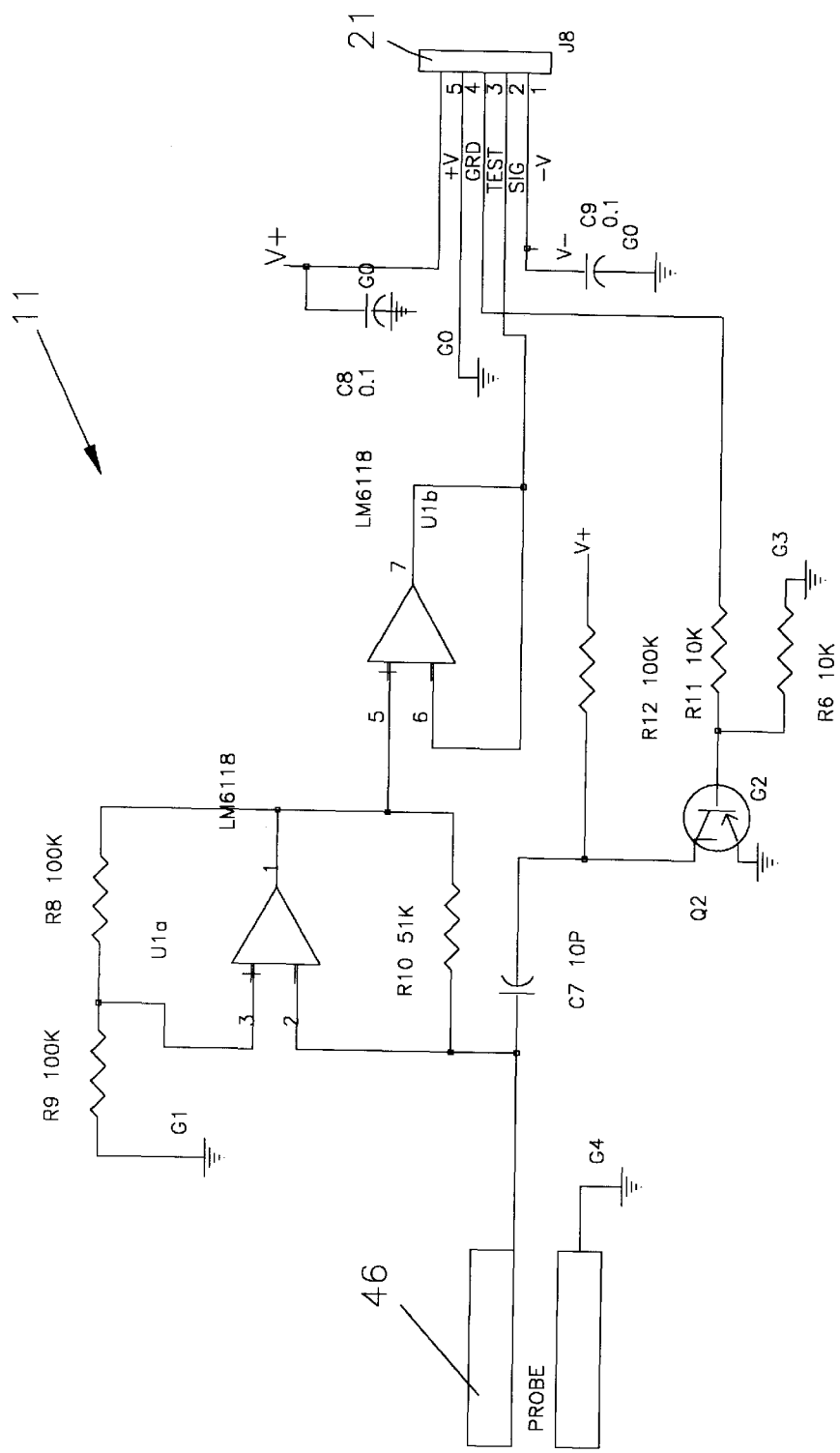
FIG. 3. is a circuit drawing of the probe component in accordance with the invention.

In FIG. 3, the actual circuitry of the oil-water detector probe is shown in detail and designated overall by the numeral 11. The output interface between the probe 11 and its processing circuitry as shown in FIG. 2, is made via interface 21.

Figure 4:
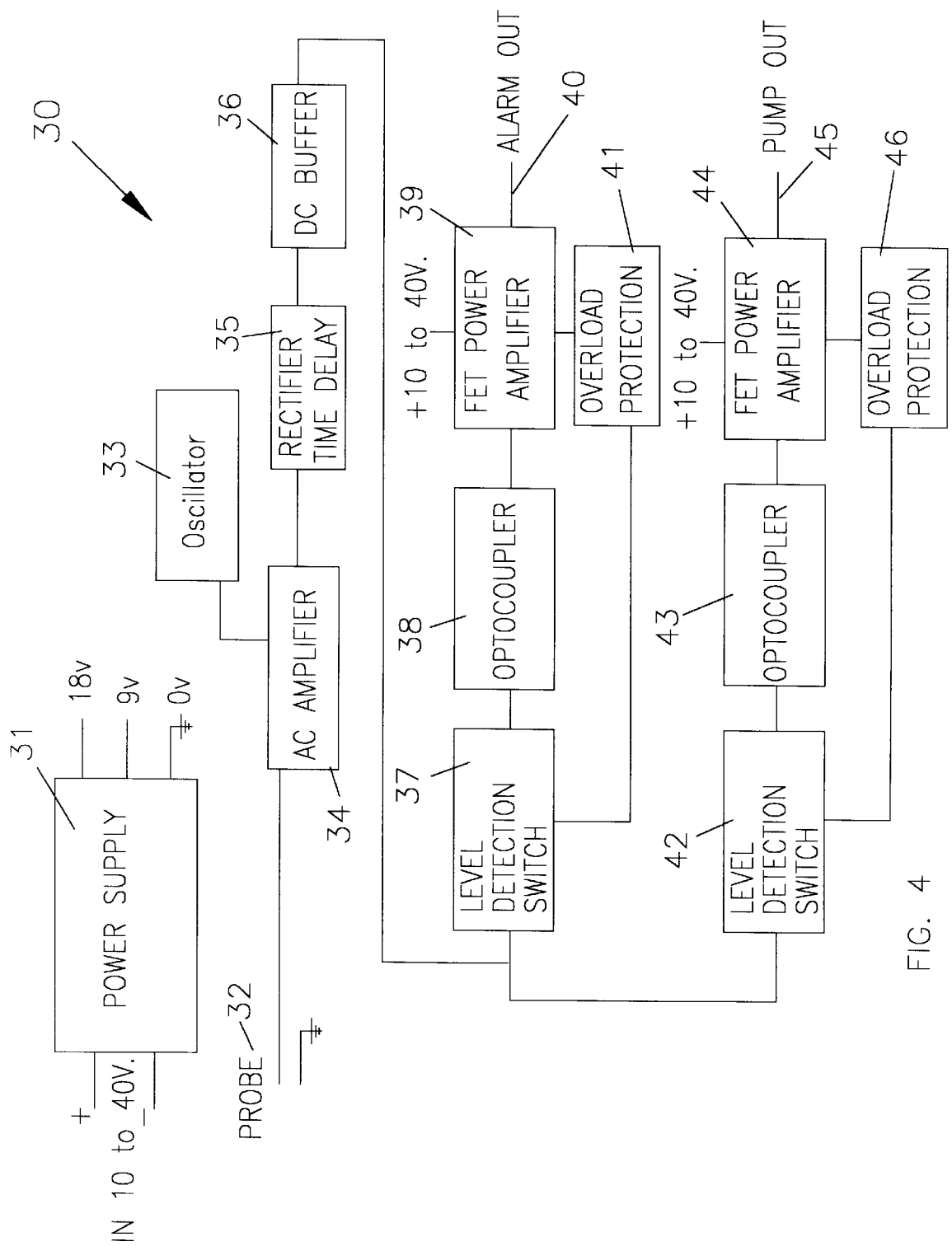
FIG. 4. is a flow diagram showing the discrete components of the instant invention configured as a bilge pump controller in accordance with the invention.

In FIG. 4, the instant invention, configured as a bilge pump controller 30 is shown in a flow chart form. Probe 32 connects to AC amplifier 34 and oscillator 33, through rectifier time delay 35, then to DC buffer 36. Buffer 36 connects to level detection switches 37 and 42 and thence to optocouplers 38 and 43 and FET power amplifiers 39 and 44. Overload protection is provided by overload protectors 41 and 46. Final outputs are to alarm outlet 40 and pump outlet 45.

Figure 5:
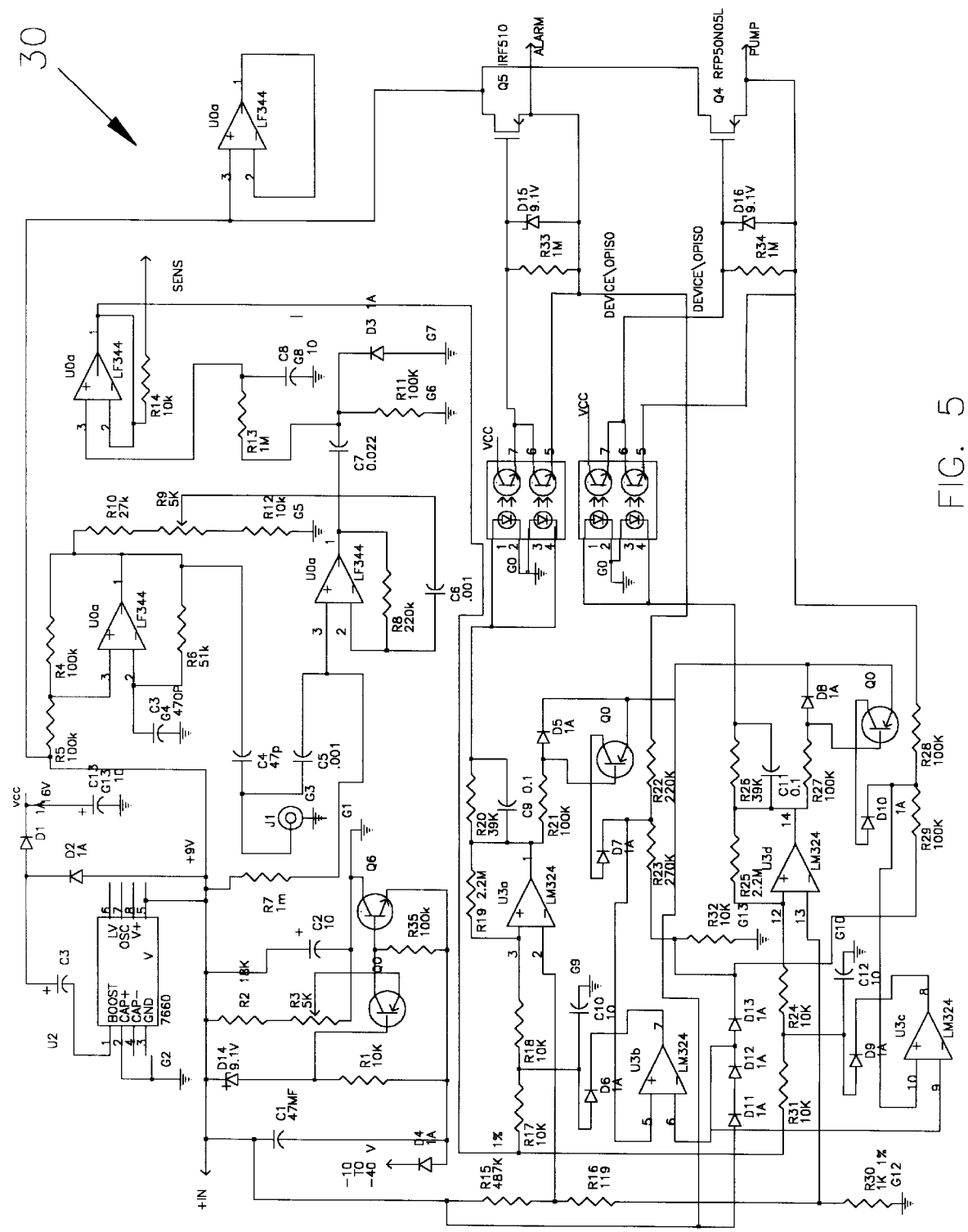
FIG. 5 is a detailed circuit diagram showing the discrete components of the invention configured as a bilge pump controller.

In FIG. 5, the actual circuitry of the oil water processing circuit is shown in detail and designated by the numeral 30.

The oil-water detector 10, by reason of its sensitivity and its calibration means, can be set to detect even minute amounts of water and can activate and deactivate pumping/signaling means with great accuracy. Its accuracy and operation are unaffected by fouling of the probe 46. Furthermore, the oil-water detector 10 can be set to read an average water level and to ignore the fluctuations of said level as the vessel moves. By setting the device to activate the pumping/signaling means only when the water level reaches a pre-set level, the device does not thereby constantly activate and deactivate the pumping/signaling means. In the event of a large spill of oil into the bilge which would, with a prior art device, activate the pumping system, the instant device ignores the oil and will not activate the pumping/signaling device unless there is a corresponding rise in the mean water level. This is a unique and useful feature in the context of environmental protection--oil is not pumped overboard.

For ease of description, the instant invention in its configuration as a bilge monitoring device has the probe 11 as described above. A controller 13 housed in the main electronic circuitry and an optional indicator panel, display 15 provide a convenient interface between the device and the operator. The functional characteristics of the controller 13 are:

Detection of water touching the probe 46;

Activation of the pumping means;

Activation of an alarm system if the water level rises beyond the capacity of the pumping means;

Activation of the alarm in the event of a mechanical failure of the cable, pump, or the probe 46 itself;

Initiation of a self-test when it is first activated.

The indicator panel 15 can be added as an option. While the controller 13 can perform all of its own functions without the indicator panel being present, the addition of the indicator panel 15 provides the operator with a convenient bilge pump control and monitoring system. The indicator panel 15 can be conveniently located near the normal controls of the vessel. In use, the panel 15 uses an LED which is capable of displaying through color changes and intermittency, all conditions and functions of the controller 13 and the pumping means. It is also fitted with a toggle switch by which the system can be switched on and off and between automatic and manual modes.

The LED signals the condition of the device in the following manner:

When solid green, the system is activated.

Flashing green shows the probe is touching water.

Flashing yellow shows the pumping means is activated automatically.

Red signals that the water is rising above the capacity of the pumping means to reduce the water level and the alarm means is activated. The alarm may be mounted remotely so as to alert people ashore to the presence of danger from the potentially sinking vessel.

Yellow means that the pumping means has been manually activated.

As shown in FIGS. 4–5, the oil-water detector 10 is capable of differentiating between water and petroleum products and can function either as a device to measure quantities of either. Programming for such diverse functions is possible through an interface which may be connected to a computer operating the unique software program designed as a utility for the instant invention. The circuitry for the probe 11 uses a dual operation amplifier which functions both as an oscillator and as a buffer, and a transistor switch which activates a fixed capacitor. The oscillator is free running and connects to the strips contained within the probe 47. Due to the fact that water has a different dielectric constant from that of petroleum products, as water rises up the probe 47, the oscillator frequency changes. The capacitor switch inserts a fixed capacitor across the probe because any failure in any other part of the circuitry would cause an incorrect and thus detectable change. The probe contains a temperature sensing thermister. Physically, the characteristics of the invention differs according to whether it is built as a bilge pump monitor or as a water detection probe. This distinction is made in part by construction of the "probe" component. In the bilge pump configuration, the probe 11 connects to the operational circuitry of the controller via a cable of fixed and predetermined length--such being a necessary component in the calibration of the device. Conversely, when constructed as an "oil-water" detector, the probe 11 contains within it a part of its detection circuitry which is then connected by a cable of no fixed length to the master circuitry. This design enables the "oil-water" detector 11 to be used within tanks of varying depths and varying distances from a monitoring station without the restraint of having to be within a close proximity to the monitoring system.

In a preferred embodiment, the special probe 11 consisted of two thin strips of copper sheeting within a fiberglass circuit board (probe 47) and was contained within a molded, outer cover of synthetic flourine-containing resins (TEFLON) as a protection and anti-fouling device.

In operation, the circuitry performs the following functions:

The frequency signal from the probe 11 is divided by 10, then applied to a Stamp II micro controller 13 which measures the frequency, applies corrections to it and visually displays the actual water depth detected by the probe 11. The Stamp II micro controller 13 then activates a test switch and recounts the frequency, again applying corrections to it. Results of the test are then displayed as an indication of the overall operation of the circuitry of the device. The scope of the second configuration encompasses a vast array of possible uses and application by reason of its unique circuitry and the versatility of the probe component.

Thus it will be appreciated that the present invention provides a new and novel oil-water detector which can be used in many environments including water or oil. It is contemplated that other embodiments and/or modifications may be made in the present invention without departure from inventive concepts manifested by the disclosed embodiments. It is expressly intended, therefore, that the foregoing description is illustrative only of preferred embodiments, not limiting, and that the true spirit and scope of the invention be determined by reference to the appended claims.

What is claimed is:

1. An oil-water detection device for monitoring the presence of water in a container, said device consisting of:

detection means for sensing the presence of water in a container, and differentiating between water and petroleum products and generating a signal dependent on the presence of water, said detection means having two thin strips of copper sheeting, a dual operation amplifier functioning as an oscillator, and a buffer, electronic means for collecting and amplifying said signal from said detection means, said electronic means having a divide by ten counter, a micro controller and a display, calibration means for providing a useful operating range and an interface between said detection means and externally mounted devices, said detection device being powered by a power supply.

2. The oil-water detection device of claim 1 wherein said detection means consists of two thin strips of copper sheeting within a fiberglass circuit board.

3. The oil-water detection device of claim 1 wherein said detection means, electronic means and said calibration means are contained within a molded outer protective cover.

4. The oil- water detection device of claim 3 wherein said outer protective cover consists of synthetic flourine-containing resins (TEFLON™).

5. An oil-water detection device for monitoring the presence of water in a container, said device consisting of:

a probe having two thin sheets of sheeting within a fiberglass circuit board, for sensing the presence of water in a container and differentiating between water and petroleum products and generating a signal on the presence of water, said probe also having a dual operation amplifier functioning as an oscillator, a buffer and a cap switch, a divide by ten counter, and a micro-controller connected to said probe, and an accessory communications link connected to said micro-controller, said detection device being powered by a power supply.

6. The oil-water detection device of claim 5 wherein a display link is connected to said micro-controller.

7. The oil water detection device of claim 5 wherein an outer protective cover consisting of synthetic flourine-containing resins (TEFLON) is formed over said detection device.

* * * * *